United States Patent
Swinson

[15] 3,662,989
[45] May 16, 1972

[54] TOWING MACHINE

[72] Inventor: Ronald D. Swinson, El Paso, Tex.

[73] Assignee: Farah Manufacturing Company, Inc., El Paso, Tex.

[22] Filed: Dec. 11, 1970

[21] Appl. No.: 97,101

[52] U.S. Cl. ............................254/8 R, 180/19 H, 280/46
[51] Int. Cl. ........................................................B60p 1/48
[58] Field of Search ............214/370; 254/8 R, 8 B, 8 C; 180/19 R, 19 H, 19 S; 280/43, 46

[56] References Cited

UNITED STATES PATENTS 3,298,705    1/1967    Neaverson et al...................254/8 R Primary Examiner—Albert J. Makay
Attorney—Curtis, Morris & Safford

[57] ABSTRACT

A device has been provided for moving and maneuvering a cart or a skid carrying thereon a load which is desired to be moved. This device comprises a means for propelling manually the device independently of the cart or, when engaged to the cart, propelling it under power, means for engaging and disengaging the cart, and means for holding the cart in an engaged position for maneuvering of the cart and moving it in a desired direction. Further, the device comprises a plate having affixed thereto four wheels and an idle or secondary wheel which idle wheel may be used to disengage two of the wheels from the surface, i.e. floor, over which the cart and the device is being moved. The means for engaging and disengaging the cart are activated merely by appropriate lowering and raising of a handle through a single arc, whereby a number of cooperating cams, cam slides, latches, springs, etc. provide for easy, maintenance-free operation of the device.

11 Claims, 9 Drawing Figures

Patented May 16, 1972

INVENTOR.
RONALD D. SWINSON

BY

Curtis, Morris & Safford
ATTORNEYS

INVENTOR.
RONALD D. SWINSON

BY
Curtis, Morris & Safford
ATTORNEYS

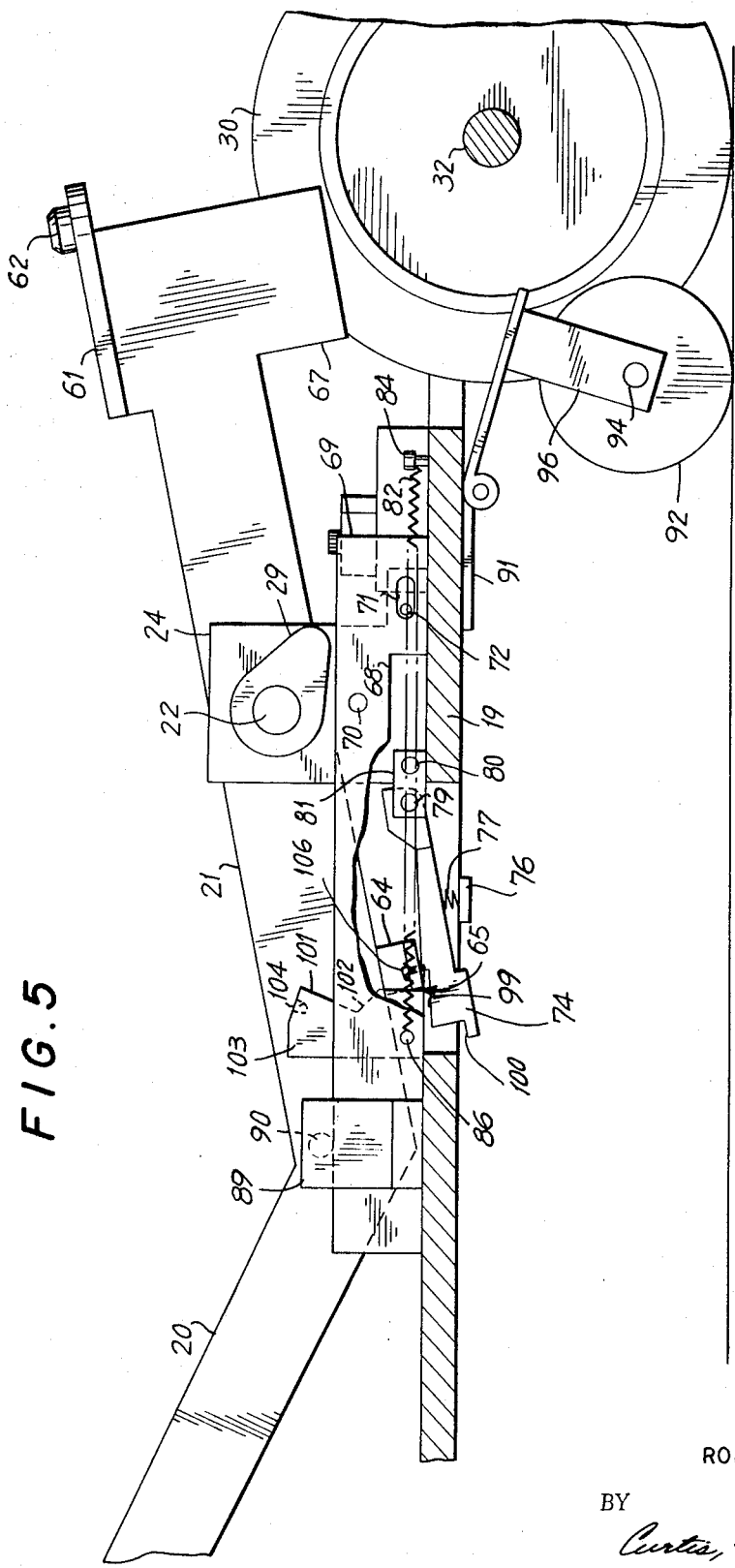

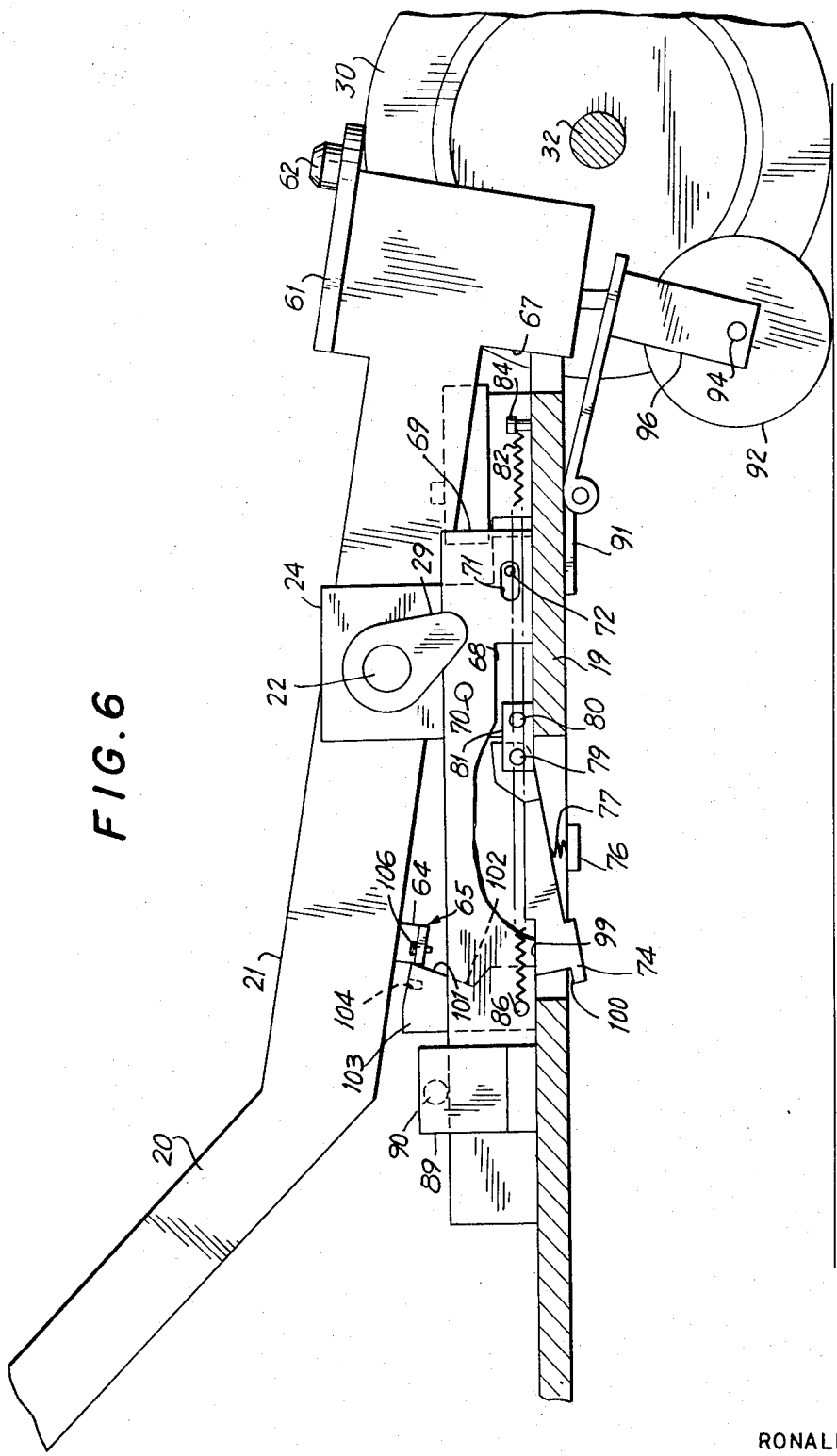

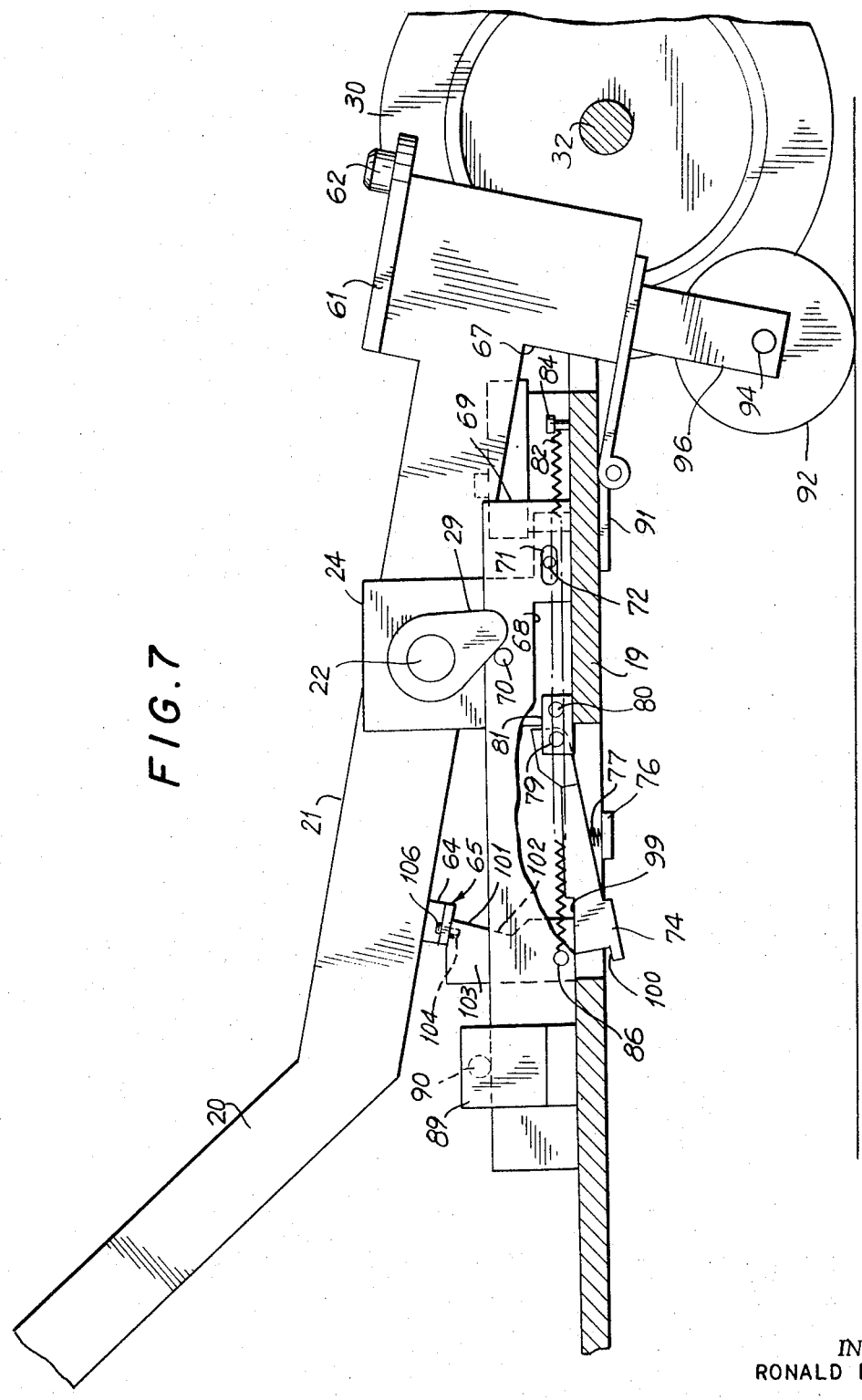

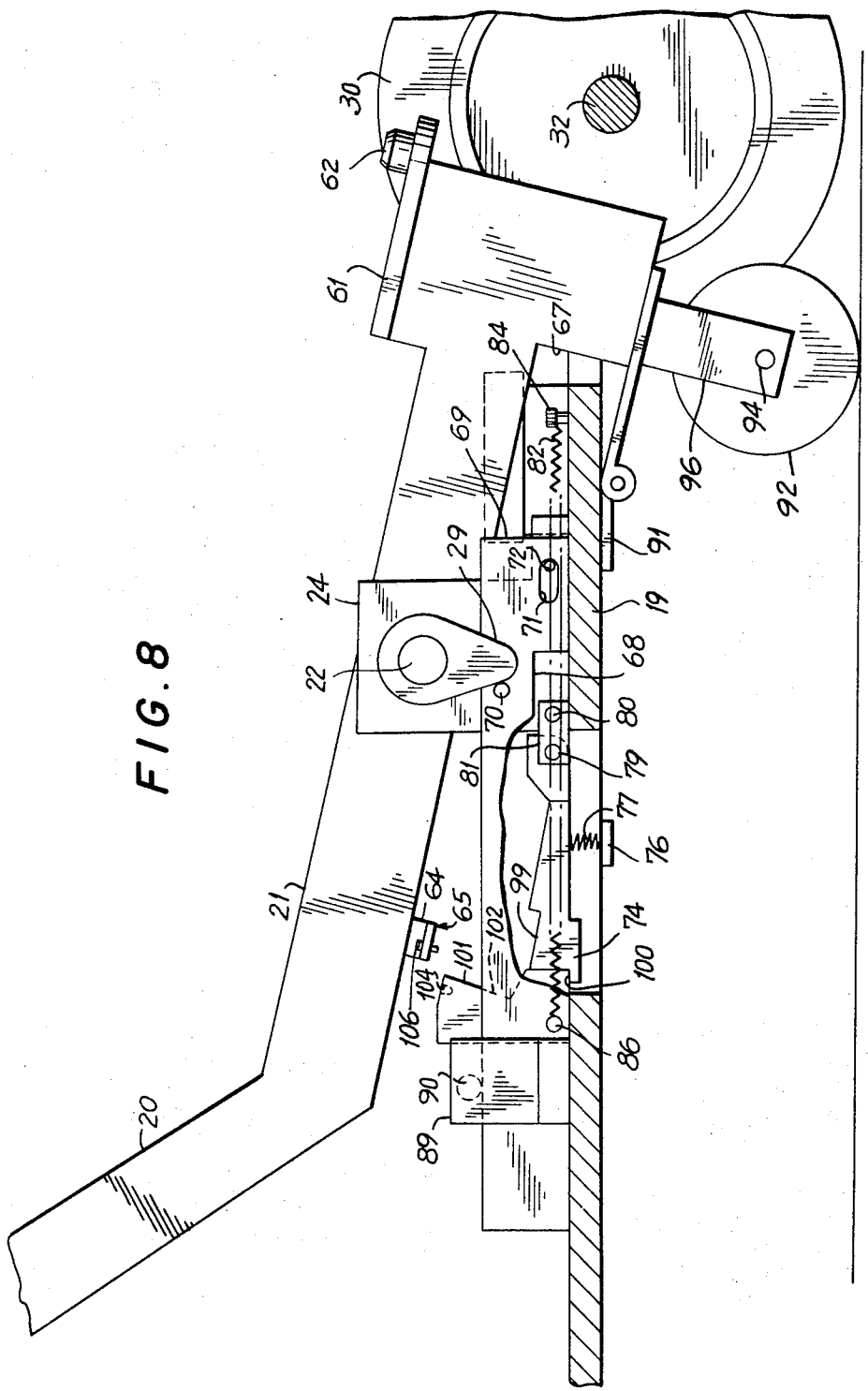

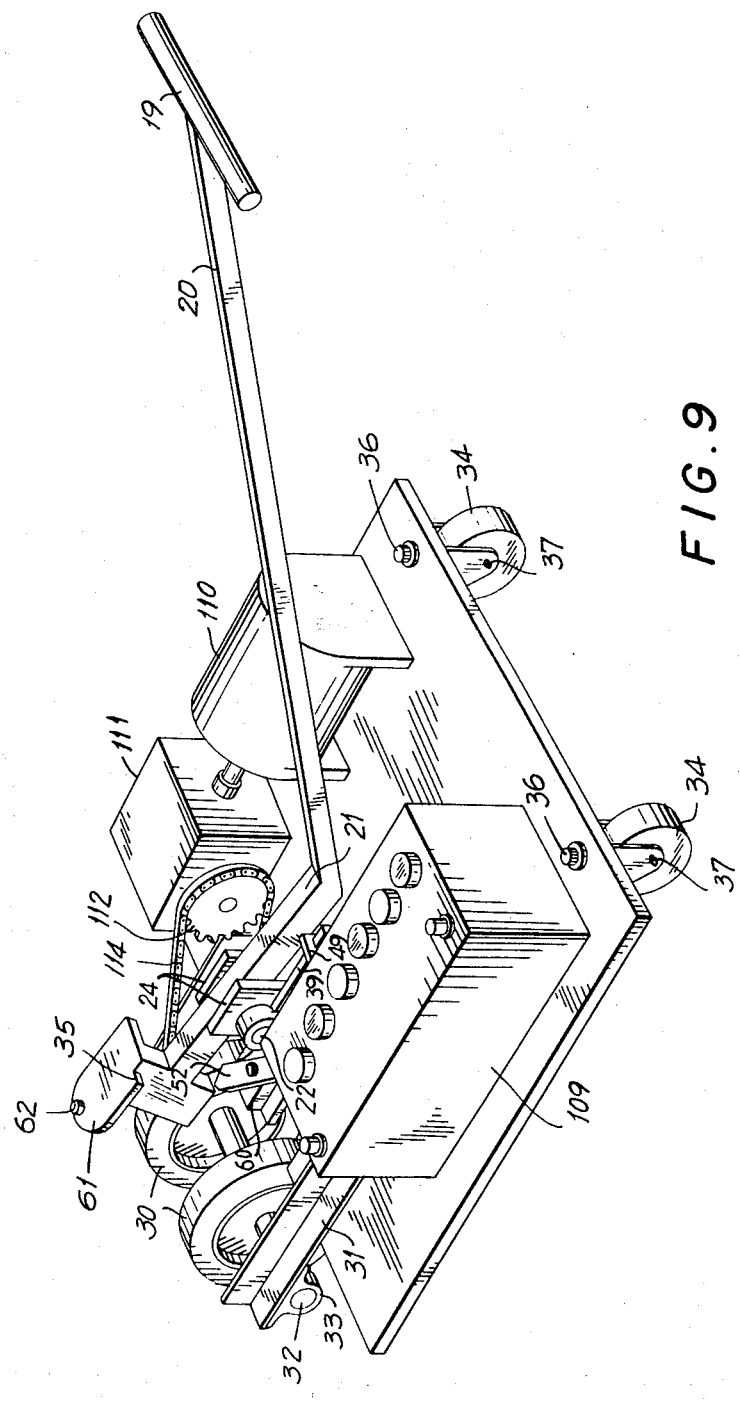

TOWING MACHINE

This invention relates to a device for moving a cart or a skid and the like; more particularly, this invention pertains to a device which is moved by an operator furnishing manual motive power when said device is not engaged with the cart, or when engaged with the cart, it is operated by means of a motor which may optionally be used for propelling the cart when the same carries a load. Still further, this invention relates to a device which has means for engaging and disengaging the cart, which means are operated by mere articulation of a lever through a single arc, said lever being articulated about a shaft placed on a platform of the device.

In the prior art, a number of devices have been employed for moving about loads in a warehouse or from place to place in a plant. For this purpose, devices have been used ranging from carts moved about by human power to devices which are powered by internal combustion engines. Thus, fork lift trucks or tow vehicles have been employed which have moved a pallet or a cart from one location to another. Other tow vehicles have been employed which have hooked a number of carts one onto another and formed a train which then has been towed from place to place. It has been found that these vehicles have been costly to operate and difficult to maintain. Moreover, the manually operated devices such as pallet movers or carts have been unsatisfactory as the heavy loads required considerable exertion by the operator.

A device has now been invented which eliminates the exertion of an operator of a manually operated cart or or pallet puller but has the same advantages as a manually operated puller for maneuverability when not moving a load; and when engaged to a cart for moving a load, the device can be employed for moving heavy loads placed on a cart by means of a motor which transmits the power to the device and yet provides for the easy maneuverability of a manual puller such as in confined spaces. Further, the present device is compact, easy to maintain, trouble-free, and requires no adjustments for its trouble-free operation. Still further, the device which propels, moves and maneuvers the loads can be easily manipulated during the cart engaging and disengaging phase of the operation. The ease of operation is especially evident in narrowly confined spaces. As an added benefit, the device occupies very small storage space.

The above advantages have been achieved by means of a number of inter-related levers, cams, cam slides, and inter-related latches, catches and springs as described and illustrated herein.

Thus, in reference to the figures herein in which like parts or parts functioning in a like manner have been identified or labeled with the same numerals:

FIG. 5 illustrates, partially broken out, in a side view the various means by which the idle wheel is rendered operative for moving the device when the same is not engaged with the cart;

FIG. 6 illustrates a further sequence from that shown in FIG. 5 pertaining to the manner in which the idle wheel is engaged and the operating, load-bearing wheels are lifted from the floor;

FIG. 7 illustrates a still further sequence from that shown in FIG. 6 and the position of the device when it is maneuvered about and when no load is being moved by the same;

FIG. 8 illustrates a still further sequence from that shown in FIGS. 5 to 7 in which the various means for engaging the idle wheel are placed when the device is ready for engaging a cart;

FIG. 9 illustrates, in perspective, the means which furnish power to the front wheels of the device and which are used to move the device when the same is engaged with a cart carrying a heavy load.

Figure 1:
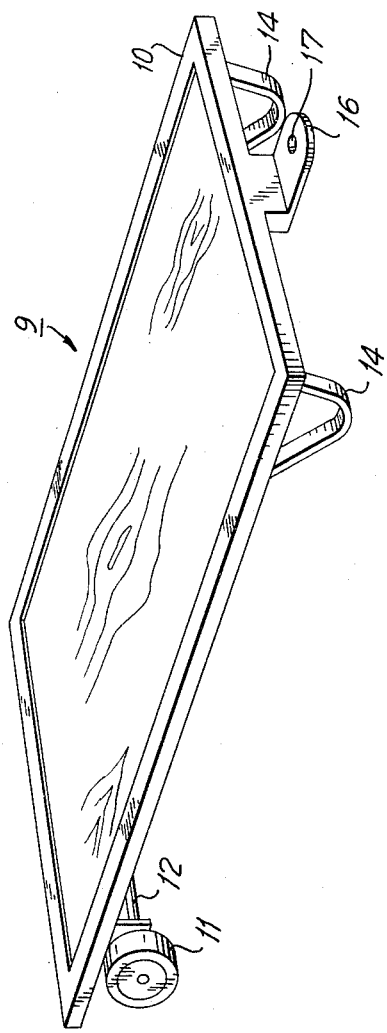
FIG. 1 illustrates in perspective a typical cart which may be moved about by the novel device.

Describing the above invention with greater particularity and referring to FIG. 1, it illustrates, in perspective, a cart 9 which is employed for moving about containers or stacked articles (not shown) from work station to work station and for storing the stacked articles. Cart 9 comprises a frame 10 having two wheels 11 mounted on an axle 12 and a pair of skids 14. A tongue 16 may be provided for the cart, longitudinally on the center line. Only one tongue is shown in FIG. 1, and it has an aperture 17 therein for engaging or connecting a means for lifting the skids 14 from the surface or floor and for moving the cart 9 about. According to the present invention and considering the cart 9 also as a pallet, the present invention shown in perspective in FIG. 9 is a machine for towing or maneuvering the cart 9. A suitable means for furnishing the motive power is illustrated in FIG. 9 and will be explained further herein as concerning its operation.

Figure 2:
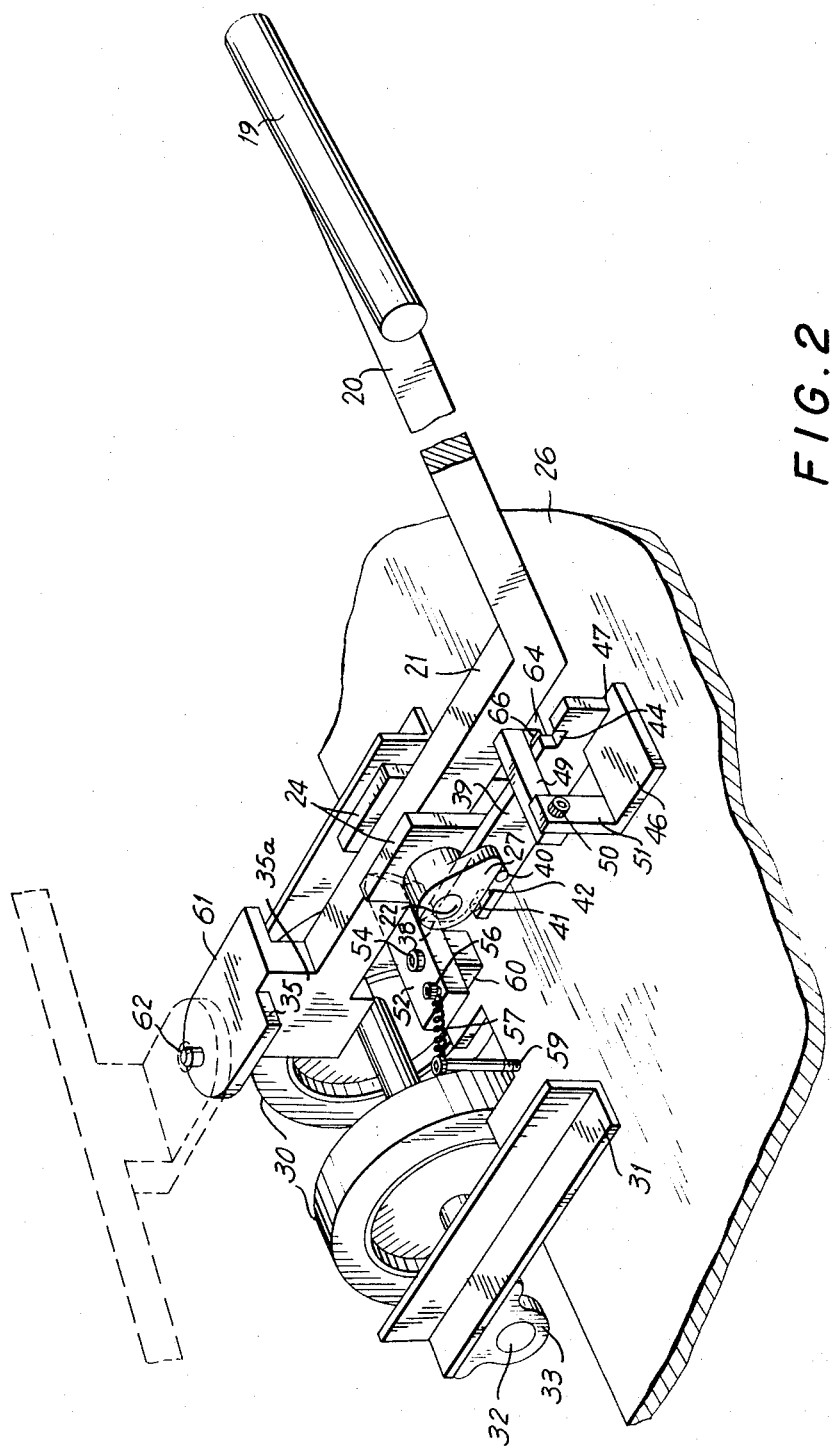
FIG. 2 illustrates in perspective the novel device in its engaged work position and the means associated with engaging and securing the cart.

In reference to FIG. 2, the handle 19 has a lever of suitable length 20 affixed thereto (which may also be hinged and locked for storage) which in turn terminates into another lever section 21. A pivot shaft 22 for lever section 21 is placed in two pillow blocks 24. The lever section 21 extends forwardly into a platform 61 for engaging the tongue 16 and the aperture 17 therein with an engaging post 62 rigidly affixed to platform 61.

The handle 19 when depressed or raised and moved only through a short arc performs all the necessary functions for the engagement or disengagement of tongue 16 with engaging platform 61 in the operation of this device.

The pillow blocks 24 are affixed to a base plate 26 in a rigid, permanent manner. Base plate 26 carries on its forward end two permanently positioned wheels 30 mounted on a shaft 32 which is affixed to the base plate 26 by means of a shaft journal 33 mounted on angle iron 31. On the aft end of the base plate 26, as shown in FIG. 9, there are two wheels 34 which are independently pivotable around a pair of pivot axles 36. Each of these wheels 34 rotate around shaft 37.

Figure 3:
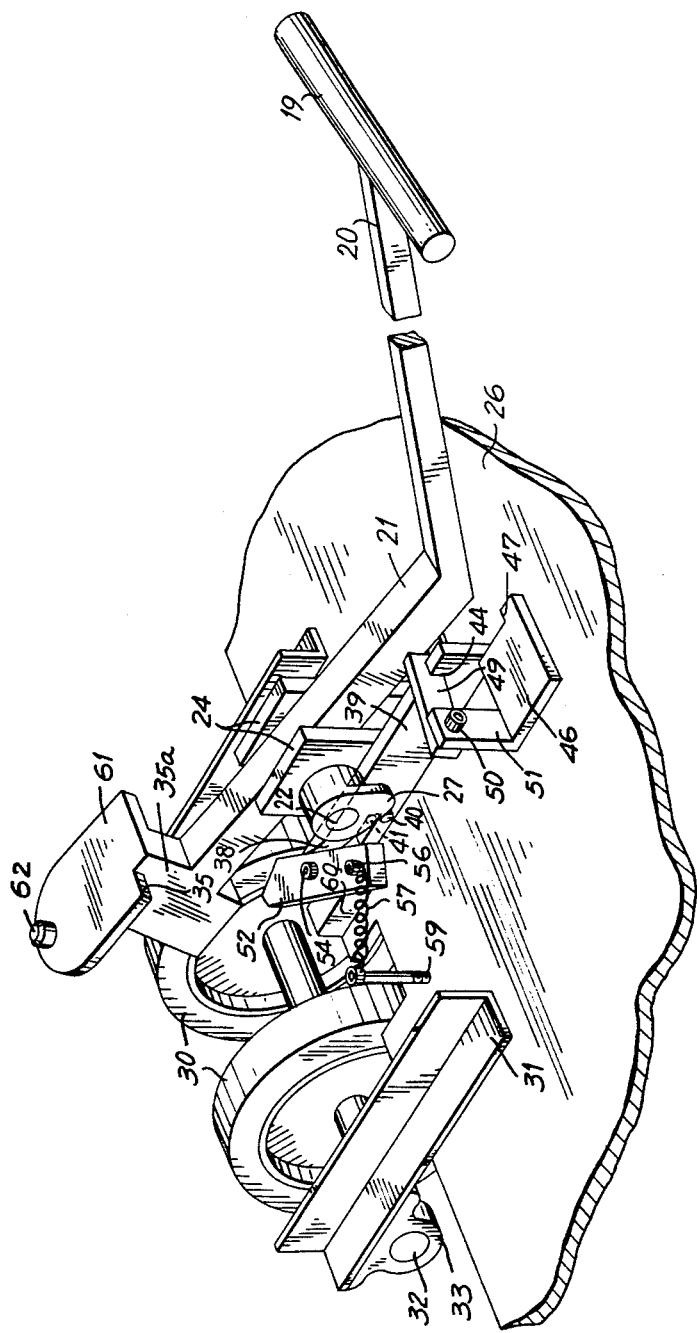
FIG. 3 illustrates the first step in the sequence in which the device is disengaged from the cart.

On base plate 26 there is mounted a cam slide 39 which is moved forwardly by cam 27. Cam 27 is rigidly affixed to shaft 22. Cam 27 performs its camming action when the operator depresses the handle 19, whereupon cam 27 engages cam slide lug 40 urging cam slide 39 forwardly, which in turn allows the cam slide 39 to cam lever stop 52 sideways when a camming surface 38 on slide 39 urges lever stop 52 forwardly. The lever stop 52 holds the lever section 21 and thus the handle 19 and assures that cart 9 is not disengaged while it is being towed. Lever stop 52 pivots on shaft 54, and it is held in its engaged position as shown in FIG. 2 by spring 57 which is affixed to bolt 56 on the lever and bolt 59 attached to the base plate 26. The lever is mounted at an appropriate height on block 60, and in its disengaged position is shown in FIG. 3. A notch 35 on lever section 21 accommodates the lever stop 52 and illustrates how the lever stop 52 rides against the surface 35a when the lever 52 is not in a locking position. Slide 39 is guided abuttingly by pillow blocks 24 and a guide block 46. Protruding from pillow block 24 is guide lug 41 which horizontally guides the slide 39 and which is confined in aperture 42.

As the handle 19 is being depressed and slide 39 is being moved forwardly, slide stop lever 49 which pivots on shaft 50 mounted on a shaft holder 51 engages notch 44 in said slide 39. Notch 44 and slide stop lever 49 effectively confine the depression of the handle 19 preventing the cam 27 from urging slide 39 forwardly.

Slide 39 in its forwardmost, stopped position as restrained by slide stop lever 44 is shown in FIG. 3. Lever 49 may be downwardly spring operated.

Figure 4:
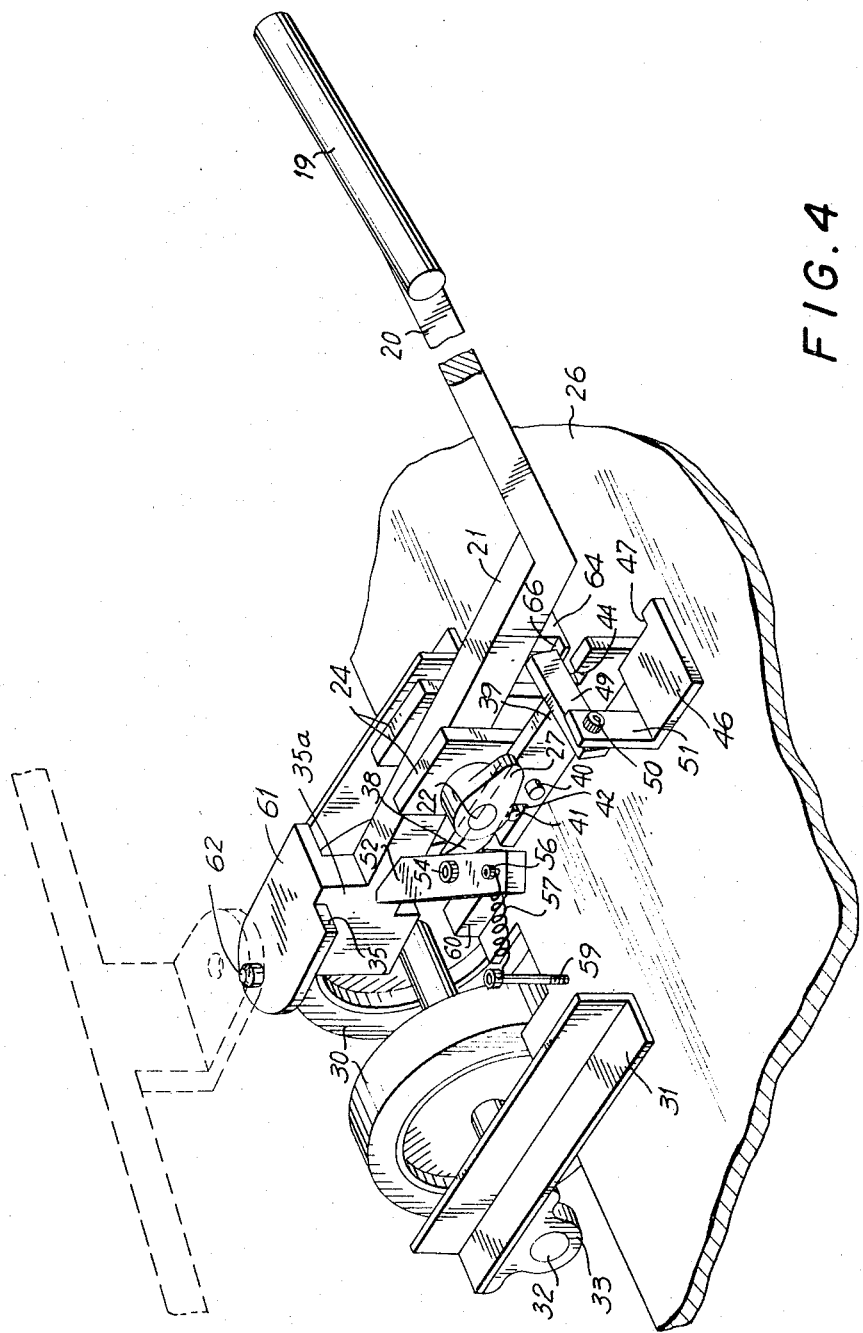
FIG. 4 illustrates the further sequence in the disengagement of the device from the cart shown in FIG. 1.

In FIG. 4, the handle 19, when it is being lifted upwardly, has at the bottom of lever section 21, also shown in FIG. 2, affixed thereto a slide stop lever release 64 designated hereafter slide lever release 64 having a notch 66. Upon lifting handle 19 upwardly, slide stop lever 49 is disengaged from slide 39 by lever release 64.

When the handle 19 is being lifted and the tongue engaging post 62 removed from tongue 16 and its aperture 17, the lever stop 52 is prevented from moving backwardly by an appropriate vertical thickness of the lever section 21 which prevents lever stop 52 from returning to a position shown in FIG. 2. Further, as shown in FIG. 8, the height of the handle 19 to which it can be lifted is also restrained by slide 69, slide lug 72, in aperture 71 and the relative movement of the slide 69.

Turning now to FIG. 5, the mechanism for lowering the idle wheel 92 is shown therein. The idle wheel 92 is engaged with the floor when no load is being moved about and the tow device merely moved from one place to another. Thus, handle 19, when being lifted, pivots in lever section 21 on shaft 22. Shaft 22 on its other end has a cam 29 which in relation to cam 27 may be positioned relatively differently. Cam 29 engages its corresponding cam slide 69 via the slide lug 70 as will be discussed more thoroughly herein.

In order to obtain the desired lifting of the wheels 30 from the floor and engaging of wheel 92 with the floor so that post 62 may be engaged in aperture 17 shown in FIGS. 1 and 2, the handle is held in a depressed position as shown in FIG. 5. The lever release 64 is in the form of an inverted T. On the other side of the T and as shown in FIG. 5, lever release 64 has also a projection 65 having therein a bolt 106. Projection 65 also cams slide catch 103 backwardly against the force of the spring 82 attached to the slide 69 via a bolt 86 and engaged to the base plate 26 by bolt 84 as it will be further explained herein.

As slide lever release 64 cams with projection 65 slightly backwardly the wheel lift slide catch 103, when the handle 19 is being raised, the slide lever release 64 allows the wheel lift slide latch 74 to be urged upwardly by spring 77 and engage catch 103 with first notch 99 on top of wheel lift slide latch 74. The wheel lift slide catch 103 is rigidly affixed to slide 69 and has camming surfaces 102 and 101, as shown in FIG. 6, which are engaged by the slide lever release 64 and the camming surface on projection 65.

As the handle 19 is being lifted, such as shown in the sequence from FIGS. 5 to 8, the lever section 21, which has at its end an idle wheel push rod 67, engages the hinge 91 carrying underneath the same a suitable U-shaped yoke 96 in which is mounted shaft 94 on which wheel 92 rotates.

As shown in FIG. 6, during the upward lifting of handle 19, the wheel lift slide 69 is being moved backwardly by slide lever release 64 as it cams with surface 65, wheel lift slide catch 103. As the handle 19 lifts, it allows the engaging of the bolt 106 mounted in the protrusion 65 to snap into the aperture 104 under the pressure exerted by spring 82 which urges slide 69 forwardly, i.e. towards wheels 30.

As the handle 19 is further lifted, cam 29 also has engaged the lug 70 mounted on slide 69 urging slide 69 backwardly while depressing further downwardly wheel 92 by push rod 67 in engagement with the floor and thereby lifting wheels 30 off the floor. At the same time as the handle is being raised and the wheel 92 is engaged with the floor, the slide 69 is being moved further backwardly which then allows the wheel lift slide latch 74 which is under a compression of spring 77 and confined between the latch 74 and a spring restrain plate 76 to engage wheel lift slide catch 103 and lock the wheel lift slide 69 in its leftmost position as shown in FIG. 8. The wheel lift slide latch 74 is pivoting on its pivot shaft 79 which is affixed to pillow block 24 by means of shaft strut 81 affixed to pillow block 24 with bolt 80. The wheel lift slide latch 74 has a second notch 100 which engages with the wheel lift slide catch 103 as shown in FIG. 8. A cut-out section 68 in slide 69 accommodates shaft strut 81.

The relative sliding distances of the slide 69 is defined by the aperture 61 and slide guide pin 72 moving between the two extremes in the aperture 71 as well as the wheel lift slide catch 103 when it is abuttingly urged against slide guide 89, which guide carries on top thereof a suitable means for guiding the slide 69 such as a roller 90. The slide guide 89 may be conveniently in the form of an angle iron.

If it is desired to engage a load, then the device or tow machine is maneuvered under the tongue 16 as shown in FIG. 1 so that the lever platform 61 and especially the post 62 can be positioned in aperture 17 shown in FIG. 1.

Once in position, the handle is lowered allowing the front wheels 30 to come in contact with the surface such as floor thereby disengaging the idle wheel 92. As the handle is lowered, the wheel lift slide catch 103 having been engaged by the wheel lift slide latch 74 is disengaged by slide lever release 64 mounted on lever section 21 pressing down on the slide latch 74 and disengaging it from slide catch 103. Spring 82 then moves the slide 69 towards wheel 30 and as the handle 19 and the lever section 21 are moved upwardly, the lever 21 comes to rest on top of the lever lock 52 shown in FIG. 2 and thus assumes the position illustrated therein.

The normal operating procedure of the device is as follows. Handle 19 is raised as shown in FIG. 4, and post 62 is positioned under the aperture 17 under tongue 16 of the cart as shown in FIG. 1. By further pushing the handle downwardly, the post 62 engages the aperture 17 and thereby raises the skid 9 off the ground or floor. The lever stop 52 as shown in FIG. 2 is in a position as illustrated in this figure.

In order to lower the cart and disengage the device by freeing the post 62 from aperture 17, the handle 19 is lowered in such a manner as shown in FIG. 3 locking the lever lock 52 as shown in FIG. 3. The lever lock 52 is locked to the side of the lever section 21, and it allows the raising of handle 19 permitting cart 9 to be returned to the ground as illustrated in FIG. 4.

In order to raise the front wheels 30 off the ground, the handle 19 is raised sufficiently to permit the bolt 106 to lock slide 69 by snapping bolt 106 in the slide locking pin hole 104 in slide catch 103 as illustrated in FIG. 7.

To lower again the front wheels 30, the handle 19 is raised further disengaging the bolt 106 and locking the wheel lift slide 69 in the rearmost position as shown in FIG. 8 by means of cam 29 urging backwardly pin 70 on slide 69 and locking the wheel lift slide 69 by means of the wheel lift slide latch 74. When the wheel lift slide 69 is thus locked by the latch 74, the handle can then be lowered again for engaging with the cart.

In the load moving stage as shown in FIG. 9, the electrical drive motor 110 is powered by the battery 109, and the motor is used to drive the front wheels 30 through a gear train 111 and a sprocket wheel 112 by transmitting power via the chain 114 to a sprocket wheel mounted (not shown) on front wheels 30 or shaft 32. A means for reversing the polarity of the motor permits the tow machine to transmit the power to the wheels in both directions thereby allowing the tow machine to be run forwardly and backwardly. The speed with which the wheels 30 are driven can be determined in a well known manner by the relationship of the motor speed, the gear train 111 selection and the sprocket size.

As it is illustrated above and as described, the novel tow machine or device provides for an easily operable means which can be used to transport loads on a surface. The tow device is easily maneuvered in position for engaging with the load without being necessary to use a motor.

What is claimed is:

1. A machine for moving a cart, pallet or the like comprising: a platform, a plurality of wheels underneath said platform; means for supporting a shaft on said platform, a lever section pivotably engaged to said shaft; means for engaging a cart at the end of said lever section; means for camming a first and a second slide means operatively engaged with said shaft and said lever section; means for locking said means for engaging a cart when said means for engaging are operatively connected with a cart, said means for locking and said first slide means being operatively interconnected; means for unlocking said means for locking, said means for unlocking being operatively interconnected with said first slide means; means for stopping said first slide means; a means for disengaging said machine from the cart operatively interconnected with means for unlocking a secondary wheel for maneuvering said device in a disengaged mode, said means for engaging said secondary wheel being operatively interconnected with said second slide means; means for locking said secondary wheel in a maneuvering position, operatively interconnected with said second slide means; and means for disengaging said secondary wheel operatively engaged with said second slide means and said lever section.

2. The machine as defined in claim 1 and wherein said machine comprises power means for driving a wheel.

3. The machine as defined in claim 1 and wherein the second slide means comprise means for latching the same in a first and second position wherein said first latching position is operatively interconnected with means for disengaging said load and wherein said second latching position is operatively interconnected with means for engaging said load.

4. The machine according to claim 1 and wherein said second slide means comprise a catch means operatively interconnected with said means for engaging said secondary wheel.

5. The device according to claim 4 and wherein said second slide means comprises said catch means and means for lockingly engaging said lever section with said catch means and said secondary wheel.

6. The device according to claim 1 and wherein said second slide means comprises a first and second means for camming said second slide means.

7. The device according to claim 6 and wherein said first camming means on said second slide means is reciprocally and operatively interconnected with said lever section and wherein the second camming means is rotatively interconnected with said shaft.

8. The device according to claim 1 and wherein the means for unlocking is a cam means operatively interconnected with a locking lever.

9. The device according to claim 1 and wherein the second slide means comprise a spring means for continually urging said second slide means.

10. The device according to claim 9 and wherein the second slide means comprises means for restraining sliding of said second slide means.

11. The device according to claim 1 and wherein the first slide means comprises means for restraining sliding of said first slide means.

* * * * *